(12) United States Patent
Warm et al.

(10) Patent No.: US 10,384,633 B2
(45) Date of Patent: Aug. 20, 2019

(54) AIRBAG MODULE AND VEHICLE (71) Applicant: AUTOLIV DEVELOPMENT AB, Vargarda (SE)

(72) Inventors: Annika Warm, Vargarda (SE); Marco Broussard, Dachau (DE); Harald Schuler, Niederroth (DE); Thomas Reiter, Vierkirchen (DE); Karin Ydren, Vara (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/557,559

(22) PCT Filed: Jan. 19, 2016

(86) PCT No.: PCT/EP2016/050976
§ 371 (c)(1),
(2) Date: Sep. 12, 2017

(87) PCT Pub. No.: WO2016/142083
PCT Pub. Date: Sep. 15, 2016

(65) Prior Publication Data
US 2018/0056918 A1 Mar. 1, 2018

(30) Foreign Application Priority Data

Mar. 12, 2015 (DE) .......... 10 2015 003 189
Sep. 4, 2015 (DE) .......... 10 2015 011 741

(51) Int. Cl.
B60R 21/206 (2011.01)
B60R 21/215 (2011.01)
(Continued)

(52) U.S. Cl.
CPC ........ B60R 21/2165 (2013.01); B60R 21/206 (2013.01); B60R 21/215 (2013.01);
(Continued)

(58) Field of Classification Search
CPC ... B60R 21/206; B60R 21/207; B60R 21/215; B60R 21/2165; B60R 21/2171;
(Continued)

(56) References Cited

U.S. PATENT DOCUMENTS 3,778,085 A * 12/1973 Lipkin .................. B60R 21/205
137/45
7,261,314 B2 8/2007 Schneider et al.
(Continued)

FOREIGN PATENT DOCUMENTS

DE 10 2011 011 424 A1 8/2012
WO WO 2000/035719 A1 6/2000
WO WO 2014/072154 A1 5/2014

OTHER PUBLICATIONS

International Search Report of PCT/EP2016/050976, dated Mar. 4, 2016.

Primary Examiner — Laura Freedman
(74) Attorney, Agent, or Firm — Brinks Gilson & Lione (57) ABSTRACT A knee airbag module for a motor vehicle. The airbag module has a housing which is preferably composed of plastic and has a housing base (12) and a wall extending from the housing base (12), forming an outlet opening. A receptacle is provided in a first wall section. An airbag is folded into the housing, an air generator (30) which has outflow openings located within the airbag, and a covering element which closes the outlet opening. This covering element has a main section (54) which lies substantially in one plane, at least one first end section (52) accommodated in the at least one receptacle, and a second end section (56) situated opposite the first end section (52), extends out of the plane of the main section (54) and is connected to the housing (10). The covering element (50) is produced from a blank.

26 Claims, 10 Drawing Sheets (51) Int. Cl.
*B60R 21/217* (2011.01)
*B60R 21/231* (2011.01)
*B60R 21/2165* (2011.01)
*B60R 21/00* (2006.01)

(52) U.S. Cl.
CPC ........ *B60R 21/2176* (2013.01); *B60R 21/231* (2013.01); *B60R 2021/0051* (2013.01); *B60R 2021/2178* (2013.01); *B60R 2021/23169* (2013.01)

(58) Field of Classification Search
CPC .............. B60R 21/2176; B60R 21/231; B60R 2021/0051; B60R 2021/21506; B60R 2021/23169; B60R 2021/23146; B60R 2021/2178
See application file for complete search history.

(56) References Cited

U.S. PATENT DOCUMENTS

| | | | |
|---|---|---|---|
| 7,841,655 B2* | 11/2010 | Yoshikawa | B60R 21/207 280/728.2 |
| 8,360,464 B2* | 1/2013 | Enders | B60R 21/206 280/728.2 |
| 8,500,155 B2* | 8/2013 | Enders | B60R 21/205 280/728.2 |
| 8,540,276 B2* | 9/2013 | Schneider | B60R 21/206 280/730.1 |
| 8,585,078 B1* | 11/2013 | Witt, Jr. | B60R 21/207 280/728.2 |
| 9,033,363 B2* | 5/2015 | Witt, Jr. | B60R 21/261 280/728.2 |
| 9,193,324 B2* | 11/2015 | Osterfeld | B60R 21/2176 |
| 9,555,760 B2* | 1/2017 | Kim | B60R 21/215 |
| 2006/0125214 A1 | 6/2006 | Bertossi et al. | |
| 2012/0242066 A1 | 9/2012 | Chavez et al. | |

* cited by examiner

AIRBAG MODULE AND VEHICLE

CROSS-REFERENCE TO RELATED APPLICATIONS

This application is a 35 U.S.C. § 371 national phase application of International Application No.: PCT/EP2016/050976, filed Jan. 19, 2016, which claims the benefit of priority under 35 U.S.C. § 119 to German Patent Application No.: 10 2015 003 189.9, filed Mar. 12, 2015, and German Patent Application No.: 10 2015 011 741.6, filed Sep. 4, 2015, the contents of which are incorporated herein by reference in their entirety.

FIELD OF THE INVENTION

The invention relates to an airbag module incorporating such a module.

BACKGROUND

The present invention relates primarily to a knee airbag module which is integrated into a dashboard (a/k/a instrument panel) or into the transition area between the dashboard and footwell cover in a motor vehicle interior. In principle, however, the concept according to the invention can also be used in other airbag modules, for example side impact airbag modules.

Such an airbag module generally incorporates an essentially rigid housing with an outlet opening, an airbag folded into the housing, an inflator having at least one outflow opening, generally multiple outflow openings, of which at least one outflow opening is located within the airbag, and a covering element which covers the outlet opening of the housing.

A generic airbag module, namely a knee airbag module, is described in U.S. Pat. No. 7,261,314. Here, alongside the housing base, the housing has a wall which extends from the housing base and which defines the outlet opening of the housing. The wall extending from the base is designed as a fully circumferential wall with a first wall section, namely the vehicle rear wall section, a second wall section, namely the vehicle front wall section, and two side sections which are also designated as the third and fourth wall sections. Here, the edge of the first wall section running essentially parallel to the outlet opening has a slot-shaped receptacle, which can also be designated as a mounting groove. This receptacle is used to mount an end section of the covering element.

The covering element is an injection molded element formed in one piece and can be described as having three functional sections. These three functional sections are the first end section just referred to, the main section which spans the outlet opening and which is designed to be essentially on one plane, and a second end section which is used to attach the covering element to the second wall section, so to the vehicle front section. Here, the first end section is designed in two parts, namely bifurcated, and one part of the first end section extends into the slot-shaped receptacle in which it is clamped in place.

When the gas generator is activated and the airbag inside the airbag module begins to expand, the airbag, i.e. the prevailing gas pressure therein, pushes the part of the first section of the covering element which was originally located in the receptacle out of the receptacle and the covering element, under deformation, at least partially frees up the outlet opening so that the airbag can escape through it.

For practically all components in a present day motor vehicle, even for the airbag modules installed in the motor vehicle, there is a general desire to design them to be as light as possible, so with a low mass, while fully preserving their functionality. The heaviest components in an airbag module, in particular an airbag module as set out above, are generally the housing and the inflator, usually designed as a gas generator. Particularly in knee airbag modules, this results in the following feature: owing to the distance between the occupant knee/shin area and the dashboard, which is generally very small, and owing to the fact that a knee airbag should be effective in particular for vehicle occupants not wearing a seatbelt, there is very little time between the point in time when the gas generator receives the initiation signal and the time at which the knee airbag should be fully unfolded and deployed.

SUMMARY

On the basis of the foregoing, the object of this invention is to further develop an airbag module such that it can be designed with low mass. Furthermore, the design of the airbag module should be such that the airbag escapes quickly through the outlet opening. This task is achieved through an airbag module with the features described herein.

As in the generic U.S. Pat. No. 7,261,314, the covering element is an element which is separate from but connected to the housing. According to the present invention, however, the covering element is not an injection molded part, but rather a blank, in particular made of a textile fabric material. On the one hand, this simplifies production of the covering element, but the main advantage lies in the fact that very high flexibility, at least section by section, can be achieved while at the same time achieving very high tearing and breaking strength. Owing to the design of the covering element as a blank, even if it is only possible to create relatively simple geometries (namely those which can be produced through bending of a flat element), it has been proven that a sufficiently strong covering element can be produced notwithstanding such geometries.

The preferred application for the invention is in the field of knee airbag modules, wherein the invention can in particular be used such that the knee airbag module attaches to the lower end of the dashboard so that the main section of the covering element forms the footwell cover or a part of the same. For this application, the very good flexibility, at least section by section, of the covering element, combined with high rigidity opens up the possibility of arranging the airbag module such that the first wall section interfaces with the lower end of the dashboard (i.e. the first wall section forms the vehicle rear end of the housing). In this case, the covering element is pivoted through about 180° when the airbag expands so that it lies against the dashboard in sections. Hereby, a gap which may exist between the housing and the dashboard is covered and "snagging" of the expanding airbag is prevented. An additional element which covers the gap can therefore be omitted.

Felt, in particular needle felt, which is also used in the production of footwell covers, is a particularly suitable material for production of the covering element blank. This is also advantageous because the covering element forms part of the footwell cover in a preferred installation position for the airbag module according to the invention.

In order to create a covering element which is sufficiently sturdy overall and still ensure a deformability which is necessary in sections, it is often preferred that the textile material has at least two sections with different degrees of rigidity. This can be achieved in particular through a more rigid section which includes more layers than the less rigid section.

With regard to the opening behavior, it is generally advantageous for the covering element to only be connected to the housing by its first end section and its second end section.

In an embodiment of the present invention, at least part of the second end section of the covering element is immediately adjacent to the airbag. This results in the possibility of choosing the geometry of the covering element such that a force is applied at a very early point in time after ignition of the gas generator to the covering element in a direction, which pulls the first end section of the covering element out of the receptacle on the first wall of the housing and which is preferably oriented diagonally to the outlet opening. The total force, and thus the gas pressure provided by the gas generator (inflator) which is required in order to open the covering element is thereby reduced, which means that the gas generator can be designed to be weaker (and therefore lighter) and/or the housing can be designed to be less stiff (and therefore likewise lighter). Furthermore, the airbag is able to escape very quickly from the housing and very quick positioning of the airbag in its restraining position is therefore achieved.

Since it is desired that the airbag exerts force on the second end section of the covering element at a very early point in time, it is preferred, in some embodiments, for the area of airbag which is immediately adjacent to the second end section of the covering element, that it borders in sections a first filling area of the gas compartment surrounded by the airbag, in which the outflow openings for the inflator are arranged. This first filling area is naturally the area of the gas compartment which is filled with gas first, meaning that the areas of the airbag bordering the first filling area are able to exert force on surrounding elements, in particular the second end section of the covering element, at a very early point in time.

In a particularly preferred example of this embodiment, the second end section is designed with a fixing area connected to the housing and a transition area connecting the fixing area to the main section, wherein the transition area is designed in the shape of a trough. Hereby, a force component acts on the covering element immediately after triggering of the gas generator, resulting in the desired movement pulling the first section out of the receptacle. In order for this force component to be converted directly into a corresponding pulling movement of the covering element, without a necessary deformation of the housing, it is further preferred here that the transition area is spaced at least in sections away from the housing so that the housing does not support the transition area and the transition area can deform unhindered.

In order to ensure good deformability of the covering element in the region of the transition area, the second end section on the inside of the housing can be attached to the same.

In order to achieve the greatest possible transmission of force into the transition area at an early point in time during a deployment sequence, it is preferred that the inflator is a cylindrically designed gas generator, running parallel to the second end section, with radial outflow openings.

There are multiple preferred options for connecting the fixing area of the covering element to the housing. On the one hand, the mounting bolts of the gas generator can be used for fixing. As an alternative (or even in addition) to this, in a section opposite the first wall section, which can in particular be a section of a circumferential wall, the housing can be designed to be double-layered at least in sections. In this case, the fixing area for the second end section of the covering element is held, at least in sections, between the two positions of the second section.

Preferably, the second wall section has a number of projections here and the fixing area has a number of breaches, wherein the projections protrude into the breaches. A kind of latching therefore occurs. The projections can in particular be arranged outside the double-layered area.

It may be advantageous to provide a pre-weakened break line in the covering element so that the covering element is split into two parts upon expansion of the airbag.

BRIEF DESCRIPTION OF THE DRAWINGS

The invention is now described in more detail by means of embodiments with reference to the figures. The following are shown here.

DETAILED DESCRIPTION

To begin with, a first embodiment of the invention will be described with reference to FIGS. 1 to 9. The airbag module in this embodiment is a knee airbag module, which is also currently a preferred use for the invention. The housing of the knee airbag module is designed symmetrically so that it can be used both as a driver side and passenger side knee airbag module. As described in more detail later, two installation positions are provided for a gas generator in order to hereby allow for adaptation as a driver side or passenger side knee airbag module.

In the following description, reference is also made to the axes coordinates indicated in FIGS. 1 to 4.

The airbag module has a housing 10, a gas generator 30, an airbag 40 (shown in FIGS. 3 and 4 only) and a covering element 50. Here, the gas generator 30 serving as the inflator is located entirely within the airbag 40 and mounting bolts 32a, 32b for the gas generator 30 are used to attach the gas generator, the airbag and the covering element 50 to the housing 10, to which end the housing 10 has mounting holes 20a to 20d. The drawing shows the mounting bolts 32a, 32b extending through the first two mounting holes 20a, 20b. In a second installation position, these extend through the second mounting holes 20c and 20d.

Figure 6:
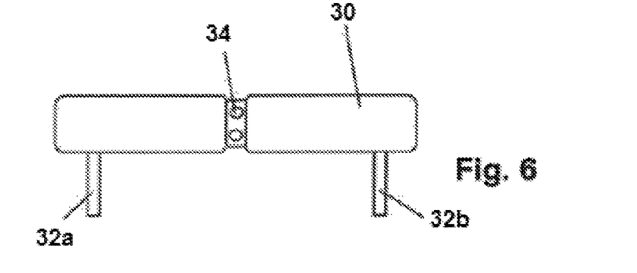
FIG. 6 shows the gas generator for the knee airbag module shown in FIGS. 1 to 5.

The gas generator 30, as shown in FIG. 6, has outflow openings 34 arranged with neutral thrust, wherein these outflow openings can be located in a central area (as shown) or in an end area.

The airbag 40 surrounds a gas compartment 41 which can have just one chamber or which can be divided into multiple chambers. The airbag is generally folded and/or rolled into a bundle. In the embodiment shown, the bundle has a folded and a rolled section. However, this should only be taken as an example. The area which immediately surrounds the gas generator is designated as the first filling area 42.

The housing 10 has a housing base 12 (the designation "housing base" is used here even though this is located above the airbag 40 in the knee airbag module shown, and a wall 14 which extends from the housing base, wherein this wall 14 is designed circumferentially with four wall sections 14a to 14d in the embodiment shown. Here, the first wall section 14a is the vehicle rear section which is adjacent to the occupant of the vehicle to be protected. Opposite this first wall section 14a is the second wall section 14b (the vehicle front wall section) through which the mounting holes 20a to 20d for the gas generator 30 extend as specified above. The third and fourth wall sections 14c, 14d form the side sections, which are designed in the embodiment shown to be concave in sections. In the third and fourth wall sections 14c, 14d respectively there is an opening, designed in the embodiment shown as an incision, for the gas generator 30, wherein a front side of the gas generator 30, which also has a socket for a initiator plug cap 36, passes through one of these openings depending on the installation position of the gas generator; the other respective opening can be sealed with a blind flange. The wall 14 surrounds an outlet opening O (see FIG. 9) through which the expanded airbag 40 escapes from the housing 10. Mounting flanges 19a, 19b are pre-formed onto the housing adjacent to the gas generator shaft.

The first wall section 14a has a receptacle 18. This receptacle is designed in the embodiment shown as a continuous slot which extends diagonally in relation to the outlet opening O such that the slot depicts a y-z direction. It is not strictly necessary for the receptacle 18 to be formed by a continuous slot, it would also be possible to provide multiple individual receptacles spaced apart from one another in the x direction; however, the provision of a continuous slot as a receptacle is preferred.

The covering element 50 has an essentially planar main section 54, a first end section 52 curving from this main section 54 and a second end section 56. In an idle state (i.e. as long as the gas generator 30 has not been triggered), the first end section 52 extends into the receptacle 18, as can, in particular, be readily seen in FIGS. 3, 4 and 7. The second end section 56 is opposite the first end section 52 and has a fixing area 56b through which the mounting bolts 32a, 32b extend. Additional fixing elements, for example in the form of plastic dowels, can be provided. A transition area 56a which connects this fixing area 56b to the main section 54 is attached to the fixing area 56b. This transition area 56a is designed in the shape of a trough, i.e. it has a concave area in the form of a groove facing the airbag 40 with a radius, wherein this radius is preferably between 10 mm and 25 mm in the first embodiment.

Figure 8:
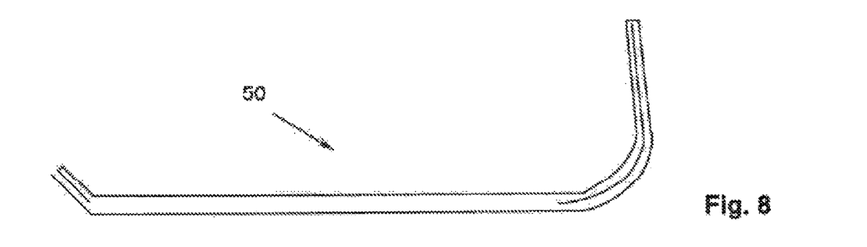
FIG. 8 shows a preferred embodiment of a covering element, of the airbag module from FIG. 7 in a highly schematic sectional view.

The covering element 50 is made of a material which is significantly more flexible than the housing 10; a preferred material for this covering element 50 is felt, in particular needle felt. Here, it may be preferred that the covering element comprises is formed with multiple sections, wherein adjacent sections have different degrees of rigidity. As shown in FIG. 8, this can in particular be achieved through sections with different numbers of layers. In the embodiment shown, three such sections are present, wherein a first section, which corresponds to the first end section, has three layers, a second section, which essentially corresponds to the second end section but which extends, to some extent, into the main section in the embodiment shown, likewise has two layers and a third section, which essentially corresponds to the main section of the covering element, has two layers. The layers can be bonded together through the application of heat. The shaping of the covering element is also preferably done using thermoforming. Of course, it is also possible to vary the number of layers, so the embodiment shown in FIG. 8 should only be taken as an example. Furthermore, linear indentations can be imprinted or perforations can be stamped in to define bend lines.

The transition area 56a is spaced away from the second wall section 14b such that there is a gap into which the transition area 56a of the second end section 56 of the covering element 50 can get out of the way upon ignition of the gas generator and expansion of the airbag 40. This will be further clarified with reference to FIGS. 7 and 9.

Figures 1, 2:
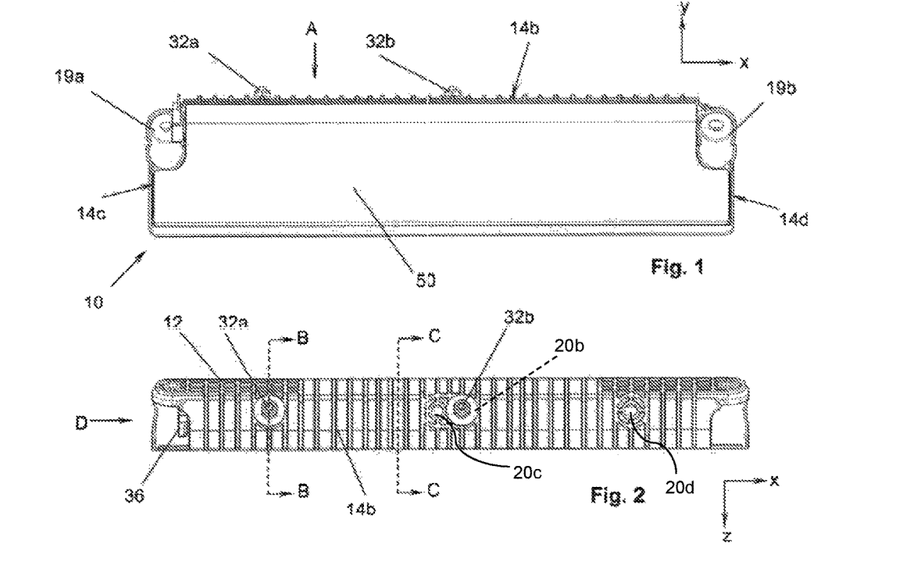
FIG. 1 shows a knee airbag module in a first plan view.
FIG. 2 shows the knee airbag module from FIG. 1 in a plan view from direction A in FIG. 1.
Figures 3, 4, 5:
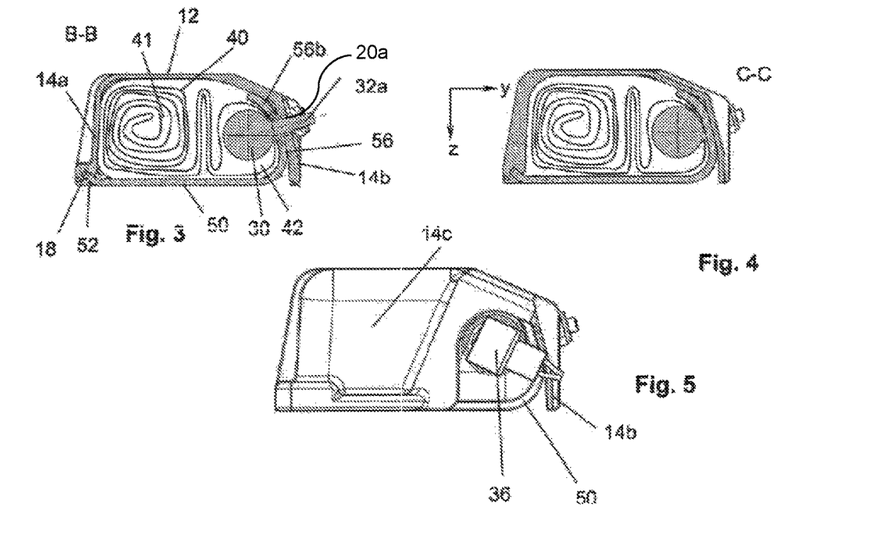
FIG. 3 shows the knee airbag module from FIG. 2 in a sectional view along the intermediate plane B-B in FIG. 2.
FIG. 4 shows the knee airbag module from FIG. 2 in a sectional view along the cross-sectional plane C-C in FIG. 2.
FIG. 5 shows the knee airbag module from FIG. 2 in a plan view from direction D.
Figure 7:
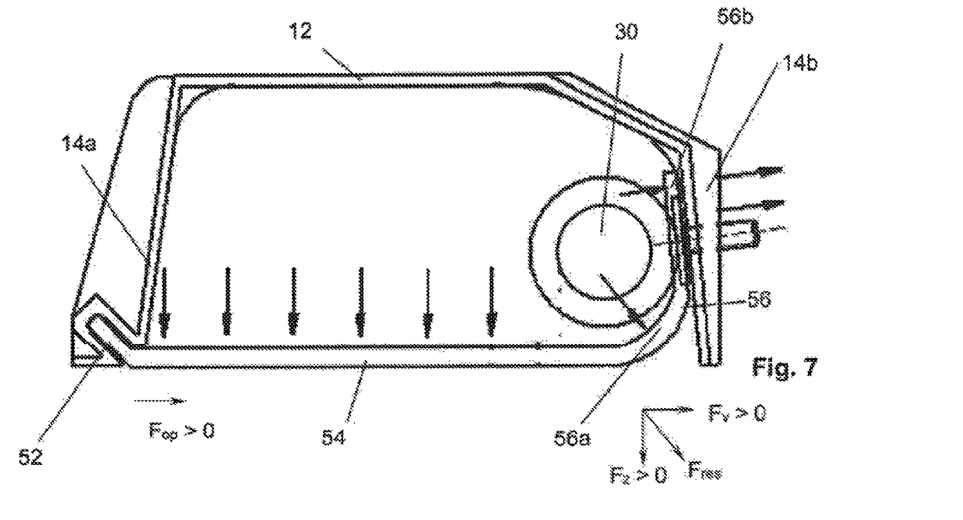
FIG. 7 shows fundamentally the subject of FIG. 3, but wherein the airbag is not shown in the interests of clarity, immediately after ignition of the gas generator.

FIG. 7 essentially shows the same thing as FIG. 3, wherein the arrows indicate the forces which act shortly after initiation of the gas generator 30, so at the beginning of filling of the airbag 40 (which is not shown), wherein a time delay is provided so that effective forces first build up in the region of the first filling area 42 of the gas compartment. It can be seen from FIG. 7 that the "point in time of the figure depiction" has been selected early enough that the covering element 50 has not yet deformed. It is possible to differentiate three directions in which the force of the gas pressure acts on the covering element 50, namely perpendicular to the main section 54, perpendicular to the fixing area 56b of the second end section 56 and radially to the transition area 56a. The force component which acts perpendicular to the fixing area 56b does not result in any deformation of the covering element 50 because these forces are immediately dissipated into the second wall section 14b (provided one were to assume full rigidity of the housing 10 for purposes of simplicity). This force component is therefore not taken into consideration hereinafter. The remaining force components have a portion in the z direction ($F_z$) and a portion in the y direction ($F_y$). This results in a consequential force in the z-y direction which is designated as the resultant force $F_{res}$. As can likewise intuitively be seen from FIG. 7, immediately after ignition of the gas generator 30, an opening force ($F_{op}$) is available, which pulls the first end section 52 out of the receptacle 18.

Figure 9:
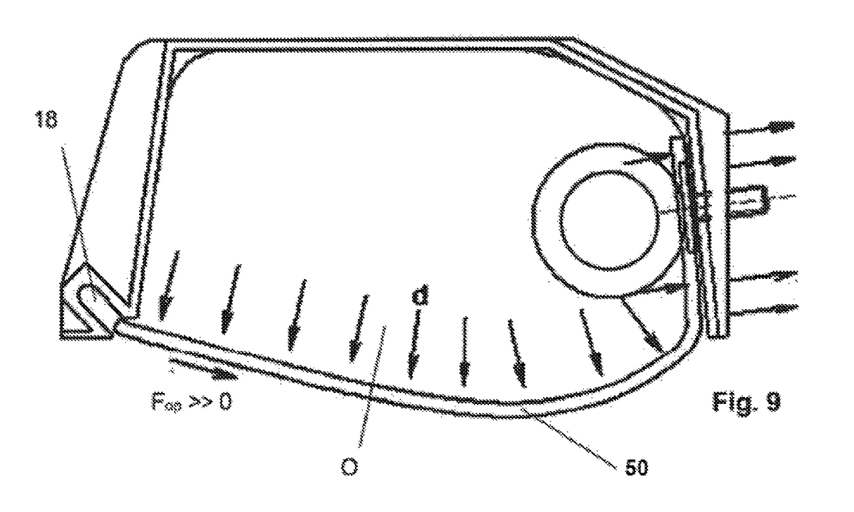
FIG. 9 shows the subject of FIG. 7 at an early phase of expansion of the airbag.

With progressive filling of the airbag 40, the covering element 50 deforms, in particular the relatively soft main section 54, as it is shown in FIG. 9, whereby the opening force is further increased. Overall, this results in very good opening behavior of the covering element 50, whereby the housing 10 is further subjected only to relatively low forces. This is favored by the fact that the covering element 50 is not attached to the third and fourth wall sections 14c and 14d.

Figure 10:
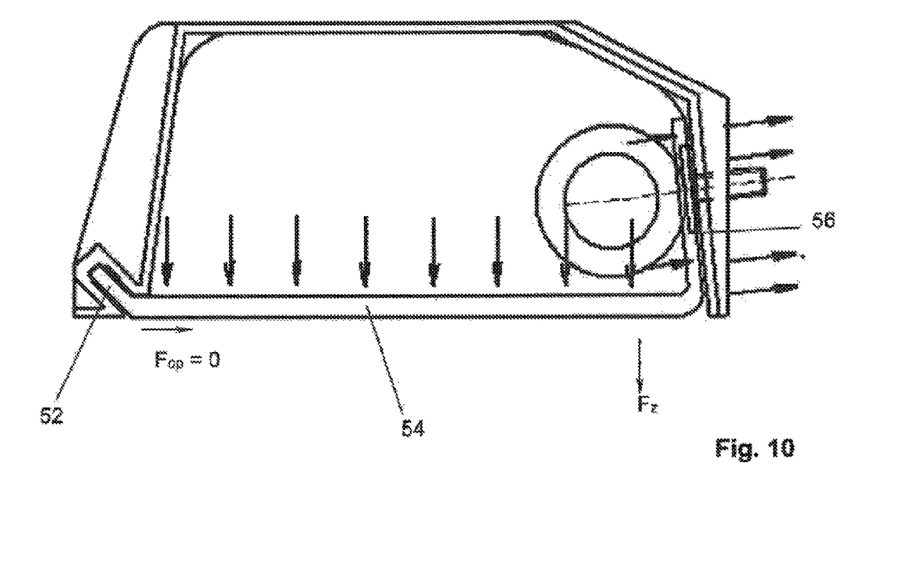
FIG. 10 shows a second embodiment of the invention in a depiction corresponding to FIG. 7.
Figure 11:
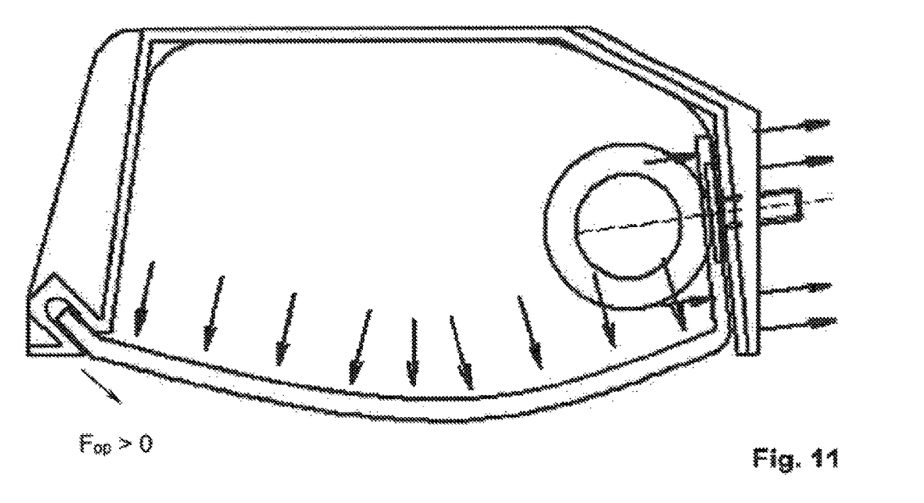
FIG. 11 shows the subject of FIG. 10 in a state corresponding to FIG. 9.

FIGS. 10 and 11 show an embodiment which differs from the embodiment described above in that practically the entire second end section 56 lies against the second wall section 14d of the housing 10 and the transition area 56a is designed to be very small and with a very small radius. Consequently, there is practically no opening force immediately after initiation of the gas generator (30) (FIG. 10) since the only effective force component is applied perpendicular to the main section 54 of the covering element 50. Only when this deforms, as shown in FIG. 11, does an opening force occur, then leading to opening of the covering element 50. For this reason, a geometry as shown in FIG. 7 is generally preferred.

Figure 12:
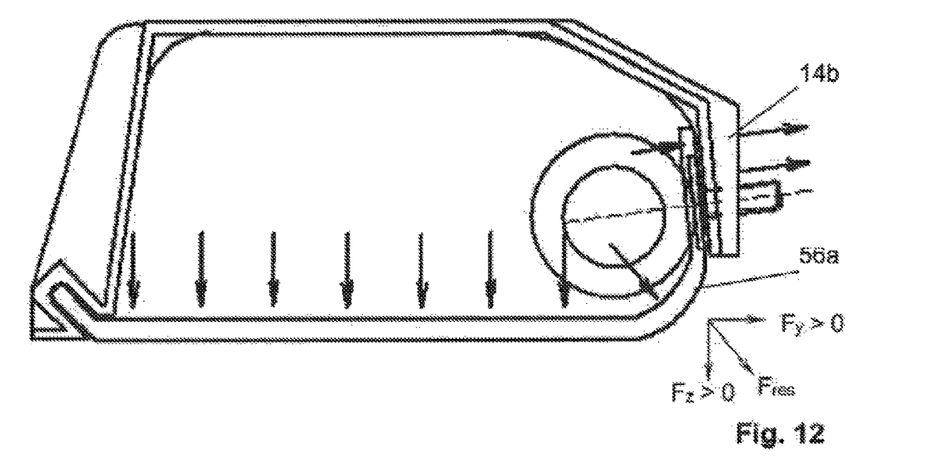
FIG. 12 shows a third embodiment of the invention in a depiction corresponding to FIG. 7.
Figure 13:
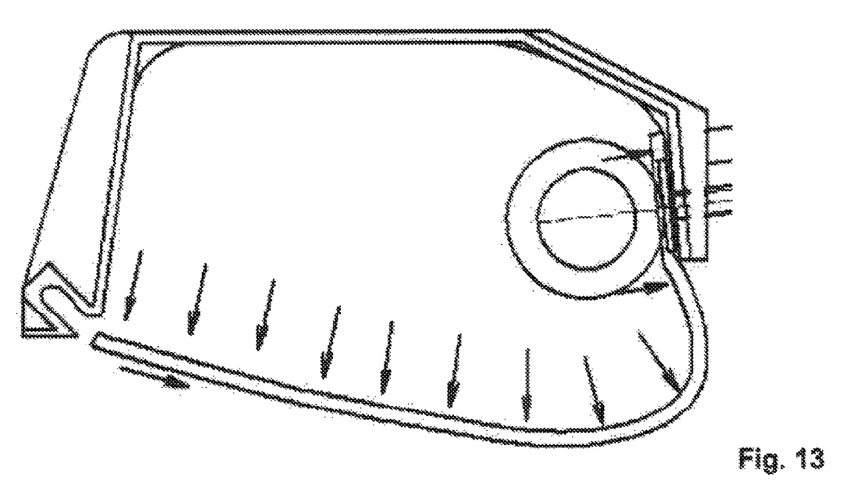
FIG. 13 shows the subject of FIG. 12 in a state corresponding to FIG. 9.

FIGS. 12 and 13 show a further embodiment which is very similar to FIGS. 7 and 9. The initial geometry corresponds exactly to that of FIG. 7, the difference from the embodiment in FIG. 7 lies in the fact that the second wall section 14b is designed to be shorter so that not only is there a gap between the transition area 56a and the second wall section 14b, but also the transition area 56a extends beyond the second wall section 14b in the z direction. This means, as can be seen in FIG. 13, that the covering element 50 is able to deform further when the airbag is filled, which can also lead to a further improvement in the opening behavior.

Figure 14:
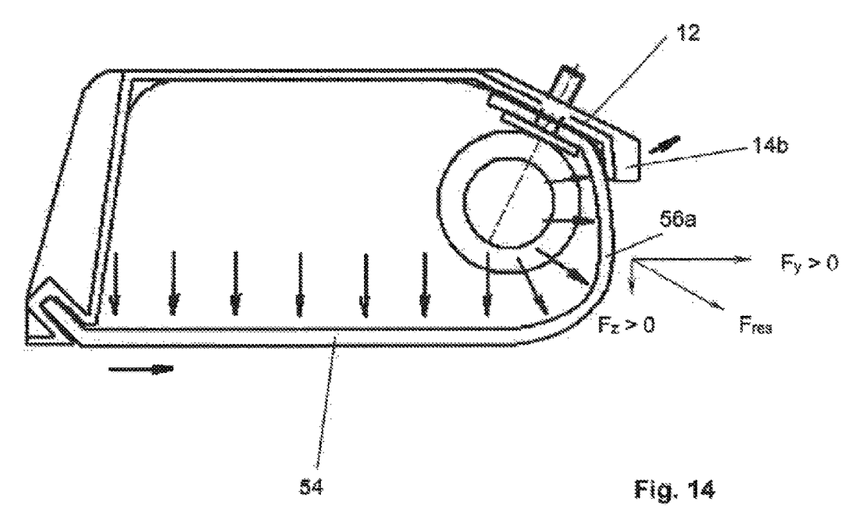
FIG. 14 shows a fourth embodiment of the invention in a depiction corresponding to FIG. 7.
Figure 15:
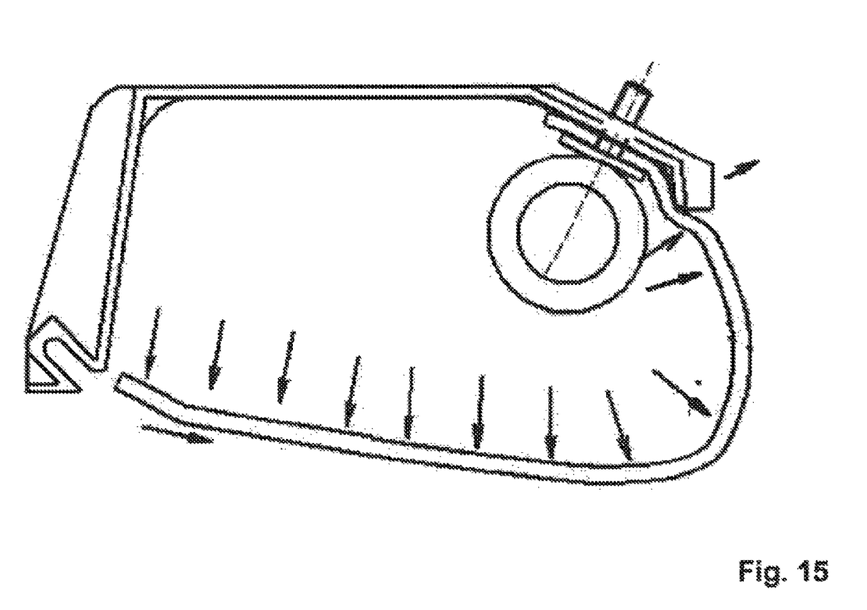
FIG. 15 shows the subject of FIG. 14 in a state corresponding to FIG. 9.

In the embodiment in FIG. 14, the gas generator 30 and thus also the fixing area 56b of the second end section 56 is attached to the housing base 12 and the second wall section 14b is designed to only be very short. The transition area 56a of the covering element 50 hereby encloses the airbag module in the direction of the vehicle front. In principle, the second wall section 14B could also be omitted in such an embodiment so that the outlet opening O would be formed by the first wall section, the third wall section, the fourth wall section and the vehicle front edge of the housing base 12. As can be seen from FIG. 14 and the marked force arrows, this geometry results in maximum initial opening force $F_{op}$. Furthermore, as can be seen in FIG. 15, the covering element 15 can open very quickly and wide.

Owing to the fact that a strong opening force is generated, the slot-like opening can have fluting or similar features to increase the friction in order to prevent accidental opening of the covering element as a result of contact by the occupant (this applies to all embodiments).

Figure 16:
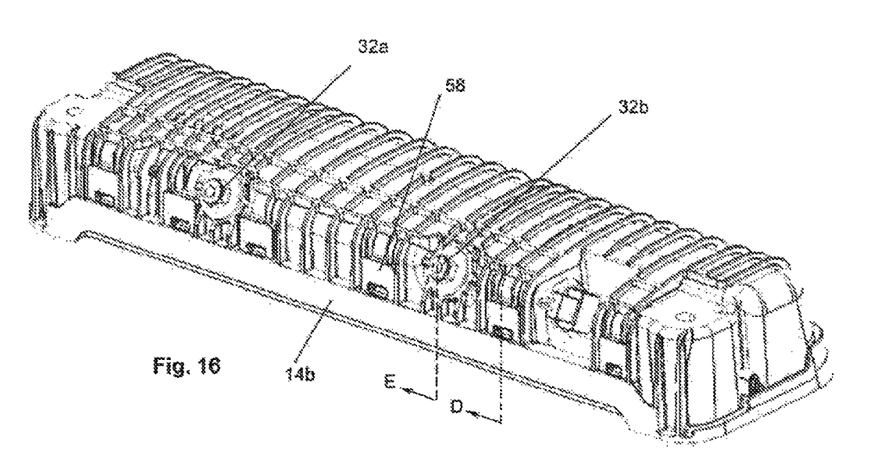
FIG. 16 shows a further embodiment of the invention in a perspective representation.
Figure 17:
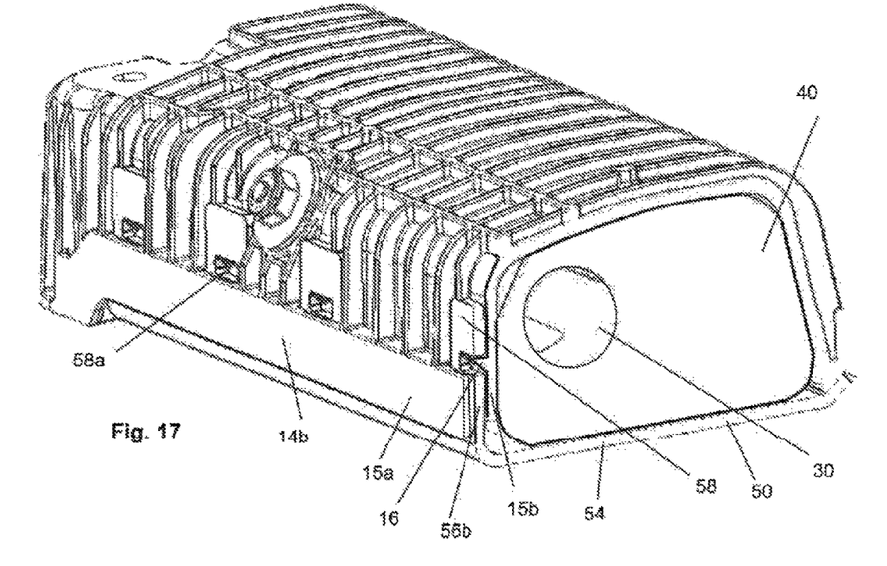
FIG. 17 shows a section along plane D in FIG. 16.
Figure 18:
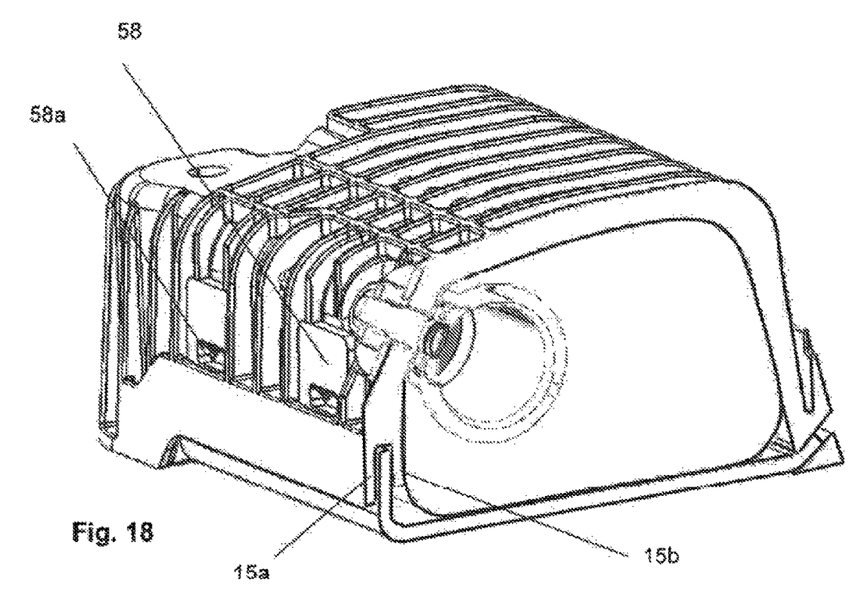
FIG. 18 shows a section along plane E in FIG. 16.

FIGS. 16 to 18 show a further embodiment of the invention. This differs from the embodiments previously described in that the connection between the fixing area 56b of the second end section 56 of the covering element 50 and the second wall section 14b (or more generally the section of the housing which is opposite the first wall section 14a) is different. The peripheral zone of the second wall section 14b is designed to be double-layered with a first layer 15a and a second layer 15b. A section of the fixing area 56b lies between the two layers 15a, 15b. A number of spaced tabs 58 are attached to this section, each of which has a breach 58a. A protrusion 16 from the housing 10 engages with each breach 58a. Here, the surface of the protrusion facing away from the outlet opening O runs essentially perpendicular to the second wall section 14b, while the other surface of the protrusion runs diagonally (see FIG. 17 and also FIG. 20 which, although it shows a different embodiment, the connection between the fixing area of the covering element and the housing is nevertheless designed in the same manner as the embodiment in FIGS. 16 to 18). Hereby, the tabs can be inserted into the position shown in FIGS. 16 to 18 but cannot be pulled out again. This type of attachment of the covering element to the housing has several advantages, on the one hand installation is done independently from the gas generator, which can be advantageous. Furthermore, the force is applied over a larger area (not just in the region of the mounting bolt for the gas generator), thus reducing the point loading.

Figure 19:
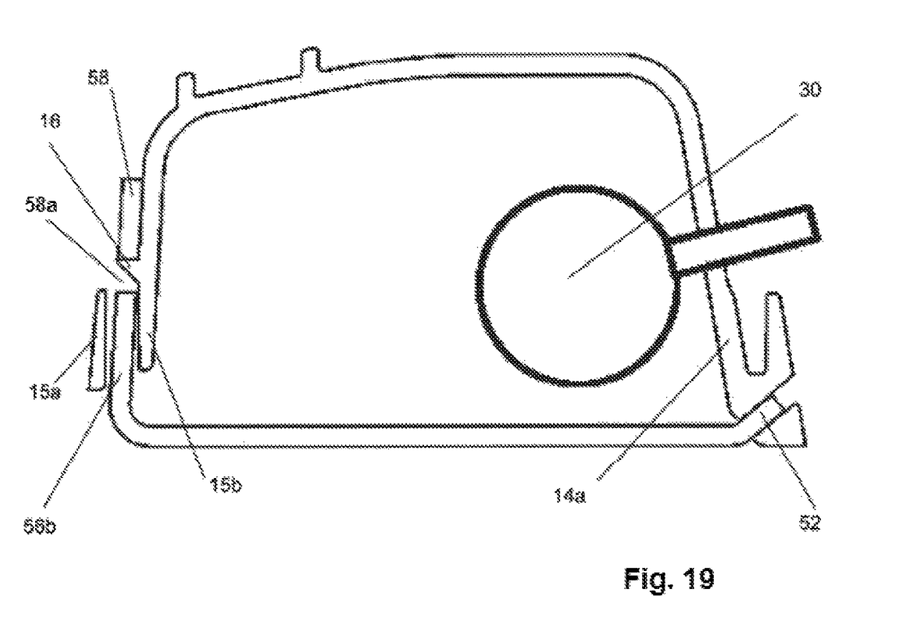
FIG. 19 shows a further embodiment of the invention in a representation according to the example of FIG. 10.
Figure 20:
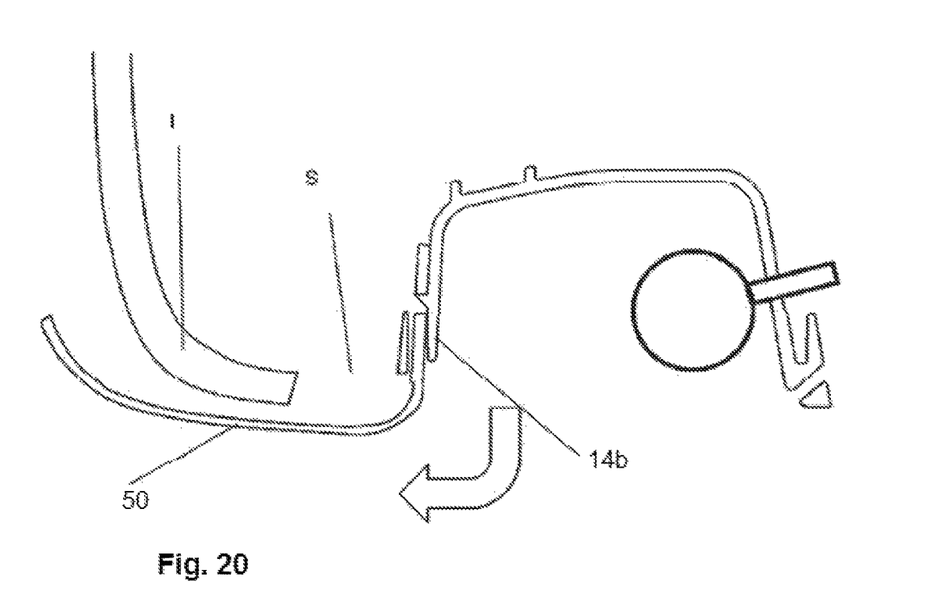
FIG. 20 shows the airbag module shown in FIG. 19, in a state as installed in a vehicle, after expansion of the airbag (not shown)

FIGS. 19 and 20 show an embodiment which differs from all embodiments previously described in that the gas generator 30 is attached to the first wall section 14a of the housing so that it is located adjacent to the first end section 52 of the covering element 50. Hereby, a force acts on the covering element 50 immediately adjacent to the first end section 52 at a very early point in time, whereby the covering element 50 opens very quickly. In the state as installed in a vehicle (FIG. 20), the gas generator 30 is located at the vehicle front end of the housing as normal. What is unusual is that the first wall section 14a forms the vehicle front end of the housing and thus the second wall section 14b, in which the fixing area of the covering element 50 is retained, is adjacent to the lower end of the dashboard I. This means that the covering element 50 is pivoted through about 180° when the airbag (not shown) expands, which is readily possible owing to the structure of the covering element 50 as described. One advantage resulting from this is that any gap which may exist between the dashboard I and the housing 10 in which the airbag could become snagged is automatically covered when the airbag expands.

Figure 21:
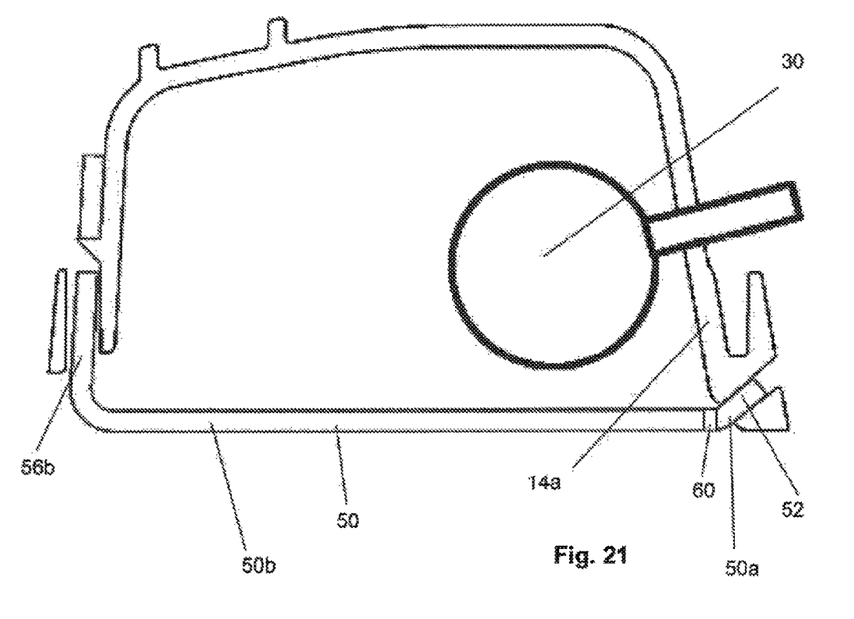
FIG. 21 shows detailed description a variation on the embodiment shown in FIG. 19.
Figure 22:
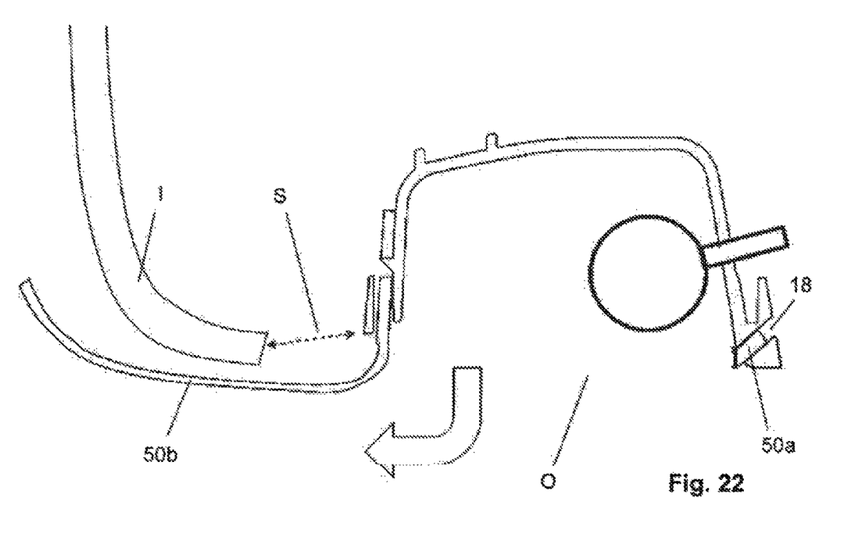
FIG. 22 shows the airbag module shown in FIG. 21, in a state as installed in a vehicle, after expansion of the airbag (not shown)

FIGS. 21 and 22 show a variation on the embodiment described above. The difference when compared with the embodiment described above lies in the fact that there is a perforation 60 running immediately adjacent to the first wall section 14a and parallel to it which forms a pre-weakened break line. This divides the covering element 50 into a first partial section 50a, which is identical to the first end section 52, and a second partial section 50b.

If the gas generator 30 is activated and the airbag (not shown) is expanded, the covering element 50 splits along the perforation 60 so that the two partial sections 50a, 50b are then also fully separated from one another. The first partial section (so the first end section 52) remains inserted into the receptacle 18, while the second partial section 50b folds back (in the direction of the vehicle), uncovers the outlet opening O in the housing and covers the gap between the housing 10 and the dashboard I.

So as to ensure that the first end section 52 remains inserted into the receptacle 18, the receptacle 18 can have an interlocking structure, for example, and/or the first end section 52 can be glued into the receptacle 18. The manufacturing costs are not increased or are increased only negligibly as a result. The provision of a pre-weakened break line and firm fixing of the first end section 52 in the receptacle 18 can have the advantage that the opening behavior is more accurately reproducible and that the vehicle user is reliably prevented from accidentally pulling the first end section 52 out of the receptacle 18.

Figure 23:
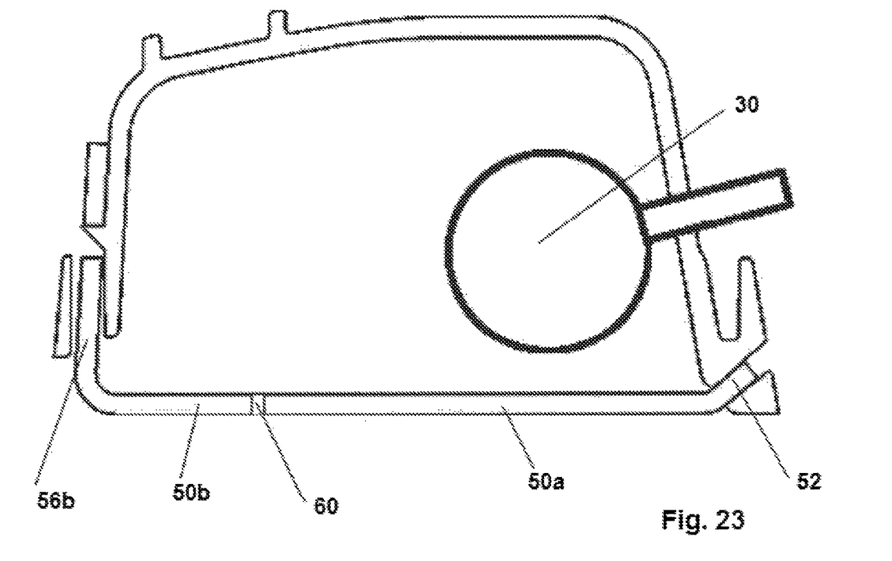
FIG. 23 shows a variation on the embodiment shown in FIG. 21.
Figure 24:
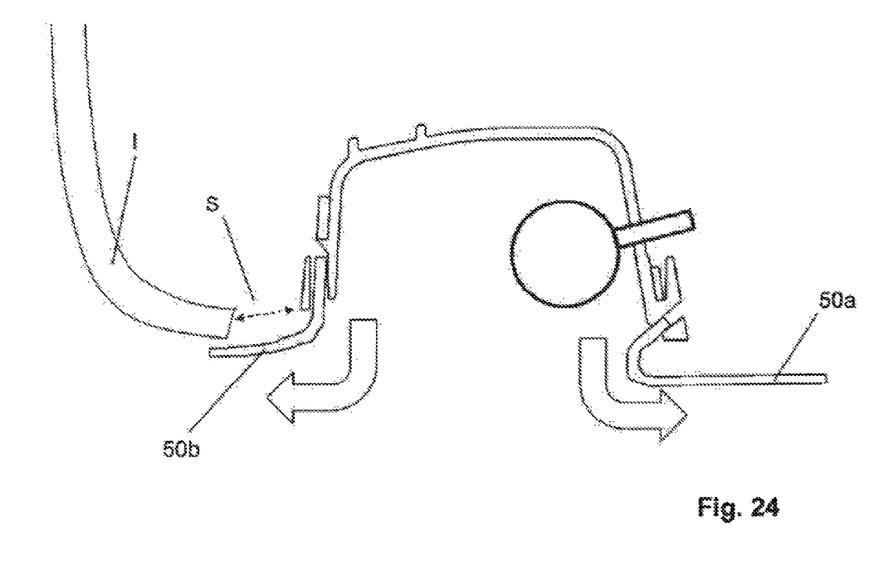
FIG. 24 shows the airbag module shown in FIG. 23, in a state as installed in a vehicle, after expansion of the airbag (not shown).

As shown in FIGS. 23 and 24, the perforation 60 can also be positioned at a distance from the first wall section 14a in the covering element 50 so that both partial sections 50a, 50b open (FIG. 24) when the airbag expands (FIG. 24). If, as described above with reference to FIGS. 19 and 20 and 21 and 22, a gap S between the dashboard I and the housing 10 should be covered, the section adjacent to the gap, here the second partial section 50b, should therefore be selected to be at least long enough to be able to span the gap S, as shown in FIG. 24. However, it is very advantageous to keep the length of this section (which must be fully opened in order to allow for full expansion of the airbag) as short as possible (but just long enough to reliably span the gap S) in order to minimize the mass to be accelerated and the moment of inertia for this section (here the second partial section 50b).

The provision of a pre-weakened break line in the covering element 40 is possible in all of the embodiments described. Instead of a perforation, the pre-weakened break line could be designed in the form of another type of weakness, for example in the form of an imprinted line, wherein a perforation is the currently preferred embodiment of a pre-weakened break line, particularly if the covering element is made of felt.

While the above description constitutes the preferred embodiment of the present invention, it will be appreciated that the invention is susceptible to modification, variation and change without departing from the proper scope and fair meaning of the accompanying claims.

The invention claimed is:

1. An airbag module comprising;
a housing which has a housing base and a wall which extends from the housing base, so that an outlet opening is defined wherein the wall has a first wall section in or on which at least one receptacle is provided,
an airbag folded into the housing,
an inflator having outflow openings, the inflator located within the airbag, and
a covering element which closes the outlet opening and which is separate from but connected to the housing and which has a main section which lies substantially in one plane, at least one first end section which is accommodated in the at least one receptacle, and a second end section which is situated opposite the first end section, which extends out of the one plane of the main section and has a fixing area which is connected to the housing,
the at least one receptacle is angled at between 1° and 30° to the one plane of the main section,
the covering element is produced from a blank so that the first end section accommodated in the receptacle also forms one end of the covering element.

2. The airbag module according to claim 1, further comprising in that the covering element is made of a textile material.

3. The airbag module according to claim 2, further comprising in that the textile material has at least two sections with different degrees of rigidity.

4. The airbag module according to claim 3, further comprising in that a more rigid section consists of more layers than a less rigid section.

5. The airbag module according to claim 1, further comprising in that the at least one receptacle forms a slot.

6. The airbag module according to claim 1, further comprising in that the covering element is only attached to the housing by the first end section and the second end section.

7. The airbag module according to claim 1, further comprising in that at least the outflow openings for the inflator are positioned adjacent to the first wall section.

8. The airbag module according to claim 1, further comprising in that the inflator is a cylindrically designed gas generator and the outflow openings are radial outflow openings which extends parallel to the second end section.

9. The airbag according to claim 8, further comprising in that at least part of the second end section is immediately adjacent to the airbag.

10. The airbag module according to claim 9, further comprising in that the area of the airbag which is immediately adjacent to the second end section of the covering element borders in sections a first filling area of a gas compartment surrounded by the airbag, in which the outflow openings for the inflator are positioned in the gas compartment.

11. The airbag module according to claim 1, further comprising in that the second end section has a transition area which connects the fixing area to the main section, wherein the transition area is designed in the shape of a trough, wherein the radius of the trough is at least about 10 mm.

12. The airbag module according to claim 11, further comprising in that the transition area is spaced at least in sections from the housing so that the housing does not support the transition area.

13. The airbag module according to claim 1, further comprising in that the housing has a second section opposite the first wall section which is at least in sections to have two layers and that the fixing area of the second end section of the covering element is held at least in sections between the two layers of the second section.

14. The airbag module according to claim 13, further comprising in that the second section has a number of protrusions and the fixing area has a number of breaches, wherein the protrusions protrude into the breaches.

15. The airbag module according to claim 14, further comprising in that the protrusions are arranged outside an area of the housing having the two layers.

16. The airbag module according to claim 14, further comprising in that the breaches are arranged in tabs which are spaced apart from one another.

17. The airbag module according to claim 1, further comprising in that the covering element has a pre-weakened break line, in the form of a perforation.

18. The airbag module according to claim 17, further comprising in that the pre-weakened break line extends parallel to the first wall section and divides the covering element into a first partial section, which is adjacent to the first wall section, and a second partial section.

19. The airbag module according to claim 18, further comprising in that the pre-weakened break line extends immediately adjacent to the first wall section so that the first partial section and the first end section are identical.

20. The airbag module according to claim 18, further comprising in that the pre-weakened break line is spaced away from the first wall section such that the first end section is part of the first partial section.

21. The airbag module according to claim 18, further comprising in that the second partial section is shorter than the first partial section in the longitudinal direction of a vehicle.

22. A vehicle with an airbag module according to claim 1, further comprising in that the airbag module is a knee airbag module which is attached to a vehicle dashboard and that the first wall section faces away from the dashboard.

23. The airbag module according to claim 1, wherein the blank is formed from felt.

24. An airbag module comprising;
a housing which has a housing base and a wall which extends from the housing base, so that an outlet opening is defined wherein the wall has a first wall section in or on which at least one receptacle is provided,
an airbag folded into the housing,
a covering element which closes the outlet opening and which is separate from but connected to the housing and which has a main section which lies substantially in one plane, at least one first end section which is accommodated in the at least one receptacle, and a second end section which is situated opposite the first end section, which extends out of the one plane of the main section and has a fixing area which is connected to the housing, the covering element is produced from a blank so that the first end section accommodated in the receptacle also forms one end of the covering element,
an inflator having radial outflow openings, the inflator located within the airbag, the inflator is a cylindrically designed gas generator and the radial outflow openings extend parallel to the second end section, and
at least one mounting bolt extending from the gas generator is provided, which connects the gas generator, the airbag, the second end section of the covering element and the housing together.

25. An airbag module comprising;
a housing which has a housing base and a wall which extends from the housing base, so that an outlet opening is defined wherein the wall has a first wall section in or on which at least one receptacle is provided,
an airbag folded into the housing,
an inflator having outflow openings, the inflator located within the airbag, and
a covering element which closes the outlet opening and which is separate from but connected to the housing and which has a main section which lies substantially in one plane, at least one first end section which is accommodated in the at least one receptacle, and a second end section which is situated opposite the first end section, which extends out of the one plane of the main section and has a fixing area which is connected to the housing,
the covering element is produced from a blank so that the first end section accommodated in the receptacle also forms one end of the covering element,
the fixing area of the second end section is attached on the inside of the housing.

26. The airbag module according to claim 25, further comprising in that the at least one receptacle is angled at between 1° and 30° to the one plane of the main section.

* * * * *